Dec. 17, 1968   F. O. MILLER   3,416,766

MOLD CONSTRUCTION

Filed Nov. 25, 1966

INVENTOR.
FREDERICK O. MILLER
BY
Learman & McCulloch

3,416,766
MOLD CONSTRUCTION

Frederick O. Miller, Saginaw, Mich., assignor to Miller Mold Company, Saginaw, Mich., a corporation of Michigan
Filed Nov. 25, 1966, Ser. No. 596,855
7 Claims. (Cl. 249—79)

This invention relates to a mold construction and more particularly to a half mold member composed of separable parts and provided with means for effecting cooling of such parts.

In the molding of plastic articles such as trays, cottage cheese containers, cups, and other large volume articles, it is not unusual for one manufacturer to produce such articles for a number of different customers. Quite often all of the articles are identical except for the provision of the customer's name or trademark at the bottom or other area of the article. Because of the necessity of providing different names or trademarks on different groups of articles, however, it heretofore has been necessary to provide multiple molds. The expense of multiple molds is substantial and results in increased cost to the customer.

In the molding of high production articles such as has been referred to, it is desirable to provide means for cooling the mold parts so as to enable maximum production capacity to be achieved. Heretofore, the necessity of cooling the mold parts has caused difficulty in the changeover from one set of molds to another.

An object of this invention is to provide a mold construction composed of separable and interchangeable parts, thereby enabling one mold part to be utilized with a plurality of other mold parts any one of which is less expensive than a complete mold.

Another object of the invention is to provide a mold construction of the character described and which is provided with means for effecting cooling of any of the interchangeable parts.

A further object of the invention is to provide coolant transfer means which facilitates the assembly and disassembly of the separable mold parts.

Other objects and advantages of the invention will be pointed out specifically or will become apparent from the following description when it is considered in conjunction with the appended claims and the accompanying drawing, in which:

Figure 1:
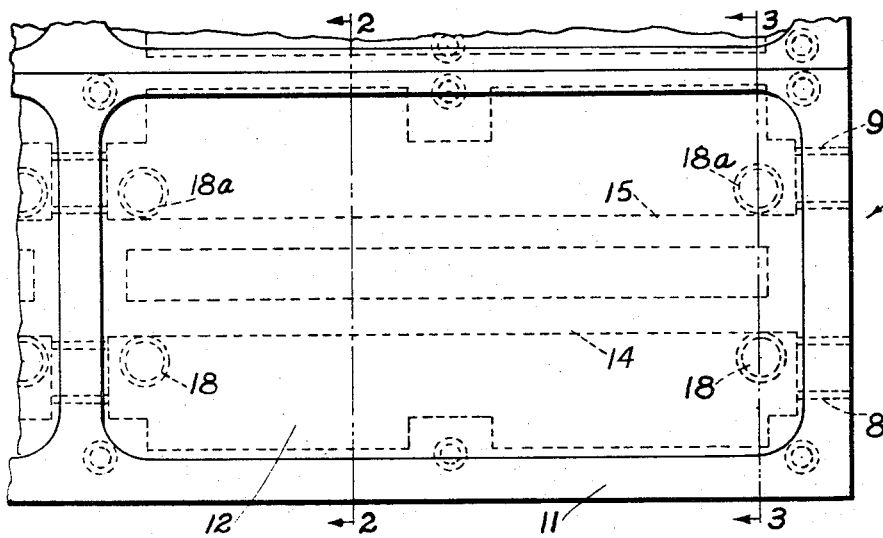
FIGURE 1 is a fragmentary, top plan view of an assembled mold half constructed in accordance with the invention.
Figure 2:
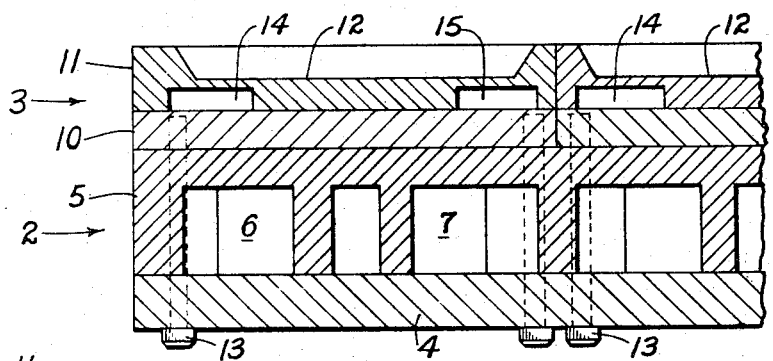
FIGURE 2 is a transverse sectional view taken on the line 2—2 of FIGURE 1.
Figure 3:
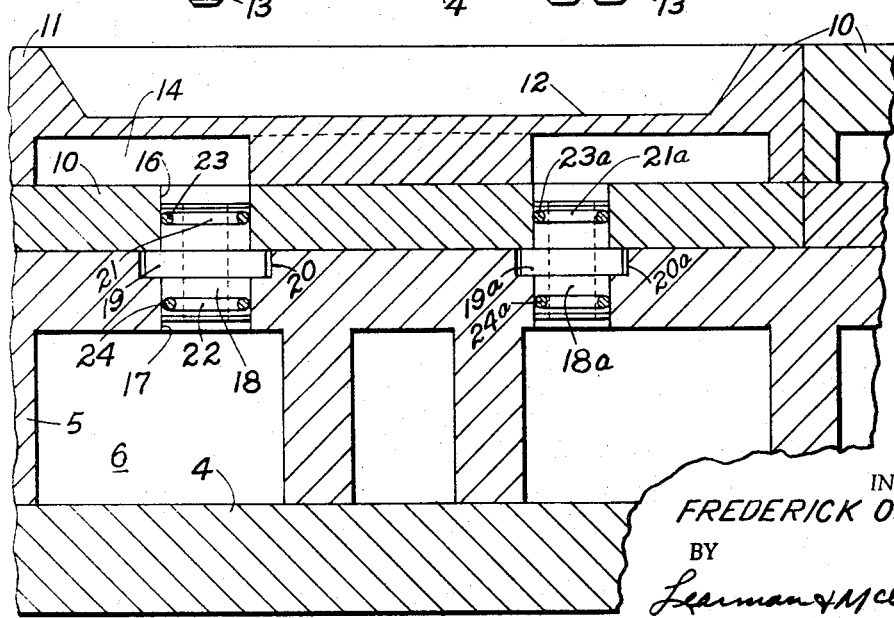
FIGURE 3 is an enlarged, transverse sectional view taken on the line 3—3 of FIGURE 1.

A mold half constructed in accordance with the invention is designated generally by the reference character 1 and comprises a base member 2 and a plurality of mold members 3 mounted atop the base member. The base member comprises a bottom plate 4 on which is mounted a cored support 5 having a plurality of passages 6 and 7 therein through which a cooling fluid, such as water, may circulate. Inlet and outlet openings 8 and 9, respectively, communicate with the passages 6 and 7 and may be connected by hoses or the like (not shown) to a reservoir of cooling fluid. Preferably, the lower surface of the support member 5 is bonded or otherwise adhesively secured to the upper surface of the bottom plate 4 so as to provide an air-tight seal therebetween.

Each mold member 3 comprises a bottom plate 10 having a smooth upper surface to which is bonded or otherwise suitably secured in air-tight relation a cavity member 11 having a recess 12 in its upper surface corresponding to the shape of the part to be molded. Each member 3 is removably secured to the base member 2 by means of suitable bolts 13.

Between the bottom member 10 and the cavity member 11 the latter is provided with a plurality of coolant passages 14 and 15 of any desired configuration. At each end of the passage 14 is a vertical port 16 which is in register with a vertical port 17 that communicates with the passage 6 through the upper wall of the support member 5. Removably accommodated in the ports 16 and 17 is a tubular coupling member 18 which is of such length as to extend into both of the parts 16 and 17. Preferably, the coupling 18 has a peripheral flange 19 between its ends which is accommodated in an enlarged recess 20 formed at the upper end of the port 17.

The opposite ends of the coupling member 18 preferably are provided with annular grooves 21 and 22 in which resilient O-ring seals 23 and 24 are received. The arrangement is such that the seals 23 and 24 prevent leakage of fluid between the support member 5 and the bottom member 10.

At opposite ends of each passage 15 are coupling members identical to coupling members 18. The coupling members at opposite ends of the passages 15 are identified by similar reference characters, followed by the suffix a.

When the parts are assembled in the manner disclosed in the drawings, cooling fluid from the reservoir may be introduced via the inlet 8 to one end of passage 6. Fluid from the passage 6 will enter the passage 14 via the coupling 18 and will be returned to the passage 6 at the opposite end of the latter via the other coupling 18. Fluid may be circulated through the passages 15 via the coupling members 18a and be returned to the reservoir via the outlet 9.

If the cavity member 10 is used to mold trays or the like, and should it be desired to substitute for the cavity member 10 a similar cavity member but one having a different customer's name or trademark inscribed thereon, it is a simple matter to replace the mold member 3 merely by loosening the bolts 13, the coupling members 18 and 18a remaining with the support member 5. Thereafter, a replacement cavity member 10 may be assembled with the base member 5, the coupling members 18 and 18a serving to guide the replacement cavity member into proper relationship with the support member 5. The bolts 13 then may be utilized to secure the cavity member to the support member and further molding operation begun. In the substitution of one mold member 3 for another, no changes or adjustments need be made in the connections of the cooling fluid tubes or hoses.

The disclosed embodiment is representative of a presently preferred form of the invention, but is intended to be illustrative rather than definitive thereof. The invention is defined in the claims.

I claim:
1. A mold construction comprising a base member having fluid passages therein; a mold member having fluid passages therein; means mounting said mold member on said base member, each of said members having ports therein communicating with the respective passages and registering with each other when said mold member is mounted on said base member; and coupling means supported in the ports of one of said members and extending into the registering ports of the other of said members for conducting fluid from the passages in one of said members to the passages of the other of said members.

2. The construction set forth in claim 1 including sealing means interposed between said coupling means and said one of said members.

3. The construction set forth in claim 1 including sealing means interposed between said coupling means and the other of said members.

4. The construction set forth in claim 1 including sealing means interposed between said coupling means and each of said members.

5. The construction set forth in claim 1 wherein said mold member is removably mounted on said base member and including means separably connecting said members together.

6. The construction set forth in claim 1 wherein said coupling means comprises a tube having a peripheral flange between its ends and wherein the associated port in said one of said members has an enlarged portion to accommodate said flange.

7. The construction set forth in claim 1 wherein said coupling means is removably accommodated in said ports.

References Cited

UNITED STATES PATENTS

| | | | |
|---|---|---|---|
| 2,364,597 | 12/1944 | Atwood. | |
| 2,900,666 | 8/1959 | Marcus | 249—79 X |
| 2,979,773 | 4/1961 | Bolstad | 18—38 X |

J. HOWARD FLINT, JR., *Primary Examiner.*